US005704957A

United States Patent [19]

Rutz

[11] Patent Number: 5,704,957

[45] Date of Patent: Jan. 6, 1998

[54] POWDER COATING SYSTEM

[75] Inventor: Guido Rutz, Gossau, Switzerland

[73] Assignee: Gema Volstatic AG, Switzerland

[21] Appl. No.: 572,896

[22] Filed: Dec. 18, 1995

[30] Foreign Application Priority Data

Dec. 24, 1994 [DE] Germany .......................... 44 46 798.2

[51] Int. Cl.[6] ............................ B01D 29/13; B01D 35/02

[52] U.S. Cl. ................................................ 55/503; 55/505

[58] Field of Search ............................ 55/503, 505, 523; 118/308

[56] References Cited

U.S. PATENT DOCUMENTS

| | | | |
|---|---|---|---|
| 928,710 | 7/1909 | Svagell | 55/505 |
| 2,792,073 | 5/1957 | Boss | 55/503 |
| 2,800,977 | 7/1957 | Stewart | 55/503 |
| 3,783,590 | 1/1974 | Allen | 55/505 |
| 3,898,063 | 8/1975 | Gazan | 55/503 |
| 4,007,969 | 2/1977 | Aubin et al. | 302/25 |
| 4,493,717 | 1/1985 | Berger, Jr. et al. | 55/503 |
| 4,526,593 | 7/1985 | Meyerson | 55/503 |
| 4,730,647 | 3/1988 | Mulder | 141/67 |
| 4,810,272 | 3/1989 | Overby | 55/505 |
| 5,037,247 | 8/1991 | Kaiser et al. | 406/153 |

FOREIGN PATENT DOCUMENTS

| | | |
|---|---|---|
| 396456B | 9/1993 | Austria . |
| 365225 | 4/1990 | European Pat. Off. . |
| 2264386 | 3/1973 | Germany . |
| 3231594 | 1/1984 | Germany . |
| 3542710 | 4/1987 | Germany . |
| 4040640 | 7/1992 | Germany . |
| 4404290 | 8/1994 | Germany . |
| 57-081854 | 5/1982 | Japan . |
| 61-127806 | 6/1986 | Japan . |
| WO 90/02698 | 3/1990 | WIPO . |
| WO 93/09878 | 5/1993 | WIPO . |

*Primary Examiner*—C. Scott Bushey

*Attorney, Agent, or Firm*—MacMillan, Sobanski & Todd

[57] ABSTRACT

A powder barrier with a filter element of microporous material for use with an air injector in a powder feeder in a powder coating system. The microporous material is permeable to air, but not to the coating powder. The powder barrier prevents a penetration of coating powder into the air feed path in a direction opposite to the air flow direction. The powder barrier permits a quick color change without the need to disassemble the air injector for cleaning.

3 Claims, 1 Drawing Sheet

POWDER COATING SYSTEM

TECHNICAL FIELD

The invention relates to a powder coating system and more particularly to a powder coating system having at least one filter in a compressed air path which can be hooked to a powder feed duct to pass compressed air into the duct while preventing a reverse flow of powder.

BACKGROUND ART

In powder coating systems, the coating powder is fluidized in order to allow it to flow through powder feed ducts. The powder is fluidized by dispersing it in air and moving the powder with the air flow. Injectors are provided for injecting air into the powder feed ducts for fluidizing the powder. Coating powder often can flow in a direction opposite to the direction of air flow. At times, the powder may flow backwards in the compressed air lines. This is a particular problem when the powder ducts are cleaned with compressed air and in pulsating powder feeding operations. The powder can be traced back up the compressed air lines to an air flow controller for the injector. The coating powder tends to deposit in niches and on sharp edges. Powder contaminations within the ducts of the injector device and in the air lines connected to the injector, as well as any equipment connected to the air lines are undesirable, since they impair system reliability. Powder deposits in the air ducts and air lines can separate from time to time and are then sprayed by the compressed air, as lumps of powder, on the article being coated, thus causing defects in the applied finish. Injector devices must be cleaned very carefully at powder change, i.e., when the color of the powder is changed, since any remainders of the old powder will contaminate the powder used thereafter. Such cleaning normally requires disassembly of the entire injector device and cleaning with compressed air. For a quick color change, it is desirable that only the injector need to be blown out, without disassembly of the entire injector device.

DISCLOSURE OF INVENTION

The invention is directed to a powder barrier device which may be inserted between a compressed air line and an injector in a powder coating system. The powder barrier includes a microporous element which passes compressed air while preventing coating powder from penetration into the air feed lines in a direction opposite to the normal compressed air flow direction. The barrier device permits a quick color change without the inherent risk of coating defects caused by the release of prior coating material deposits in the compressed air lines.

Accordingly, it is an object of the invention to provide a powder barrier for use in compressed air lines in a powder coating system.

Other objects and advantages of the invention will become apparent from the following detailed description of the invention and the accompanying drawings.

BEST MODE FOR CARRYING OUT THE INVENTION

Figure 1:
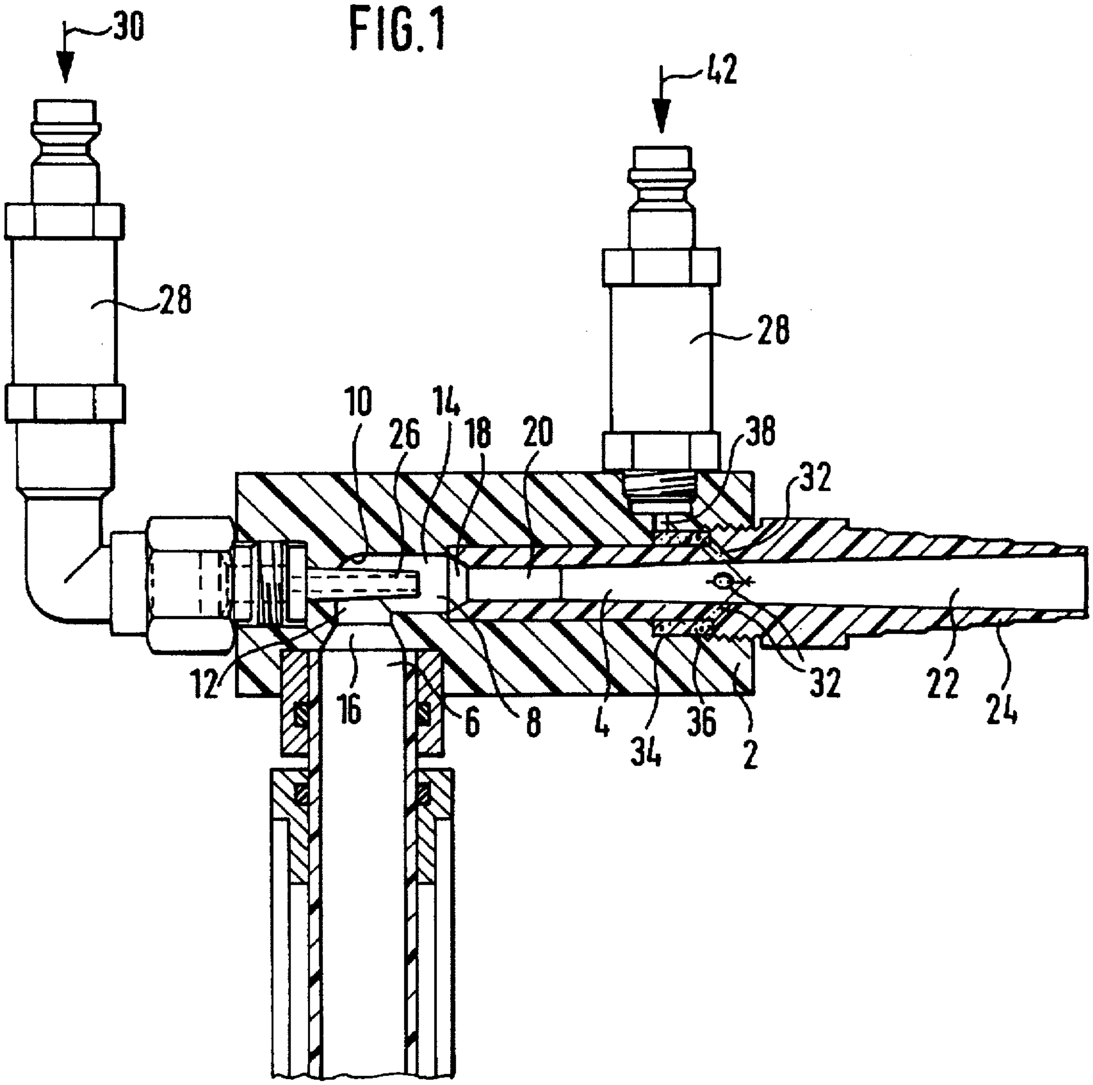
FIG. 1 is a cross sectional view through an injector for a powder duct in a powder coating system and having two air feeding lines with powder barriers according to the invention.

FIG. 1 illustrates an injector device having a housing 2 in which a powder duct 4 and a powder intake duct 6 are formed at a right angle relative to each other and are fluidically connected with each other, on their facing ends, by an angled transition duct 8. As used herein, the term "duct" is intended to cover any type of flow path, such as bores, tubes, hoses, etc. A radially outer wall 10 of the angled transition duct 8 extends in a curvilinear and stepless fashion from one side portion 12 to an angled second side portion 14. The inlet duct 6 narrows Continuously in the direction of flow at a truncated cone shaped end section 16 and empties continuously into the side portion 12. The powder duct 4 has on its upstream lead end a lead section 18 which in continuous fashion narrows conically in the direction of flow and borders continuously on the angled side portion 14. A cylindrical duct section 20 of the powder duct 4 boarders on the lead section 18. The duct section 20 is axially aligned with and has the same cross section as the smallest portion of the cone shaped end section 16. A duct section 22 of the powder duct 4 is downstream of and boarders on the cylindrical section duct section 20. The duct section 22 flares continuously in a cone fashion in the direction of flow. The powder duct 4 is formed by a tube 24 which is screwed into the injector housing 2 and allows replacement when worn.

An injector nozzle 26 is directed axially toward the upstream lead section 18 of the powder duct 4. The injector nozzle 26 protrudes into the transition duct and fluidically connects, via a powder barrier 28, to a compressed air line (not shown) which supplies a flow of compressed feed air 30. The feed air 30 flows from the injector nozzle 26 into the powder duct 4, generating a vacuum or suction in the transition duct 8, by which the powder is sucked from a powder container (not shown) through the powder intake duct 6 into the powder duct 4. The powder and the feed air 30 then flow through the powder duct 4 to a powder spray device (not shown).

Several through bores 32 are formed in the tube 24 to empty at a skew to the direction of powder flow in the expanding duct section 22. The bores 32 communicate fluidically with each other, radially outside of the tube 24, through an annular space 34 which is filled with a filter element 36 of microporous material and serves as a powder barrier. The microporous material may be a sintered bronze, a sintered aluminum or a sintered plastic such as polyethylene, or other material. The filter element 36 surrounds and is coaxial with the powder duct 4. The through bores 32 are formed on the downstream end of the annular space 34. A radial bore 38 in the injector housing 2 connects the upstream lead section of the annular space 34 through a second powder barrier 28 to an auxiliary compressed air line (not shown) for feeding a flow of auxiliary air 42. The annular duct 34 and also the filter element 36 have the hollow cylindrical shape of a bushing. The auxiliary air 42 flows radially and axially through the microporous material of the filter element 36.

The two powder barriers 28 and the filter element 36 which also functions as a powder barrier prevent the powder from proceeding from the powder duct 4 in a direction against the direction of flow of the feed air 30 and the auxiliary air 42. The powder barrier 28 for the auxiliary air 42 and the filter element 36 are meant as two alternative options, since one of both is sufficient to prevent any penetration of powder form the powder duct 4 into the auxiliary air duct. With no powder being able to proceed into the feed ducts or feed lines for feed air 30 or auxiliary air 42, disassembly of the injector device at powder change in not necessary. Scavenging the completely assembled injector device with compressed air is sufficient before changing from one powder type to another. With all ducts through which powder passes being continuous and without any niches, powder particles which might impede or prevent the cleaning of the completely assembled injector device cannot accumulate in the injector device.

Figure 2:
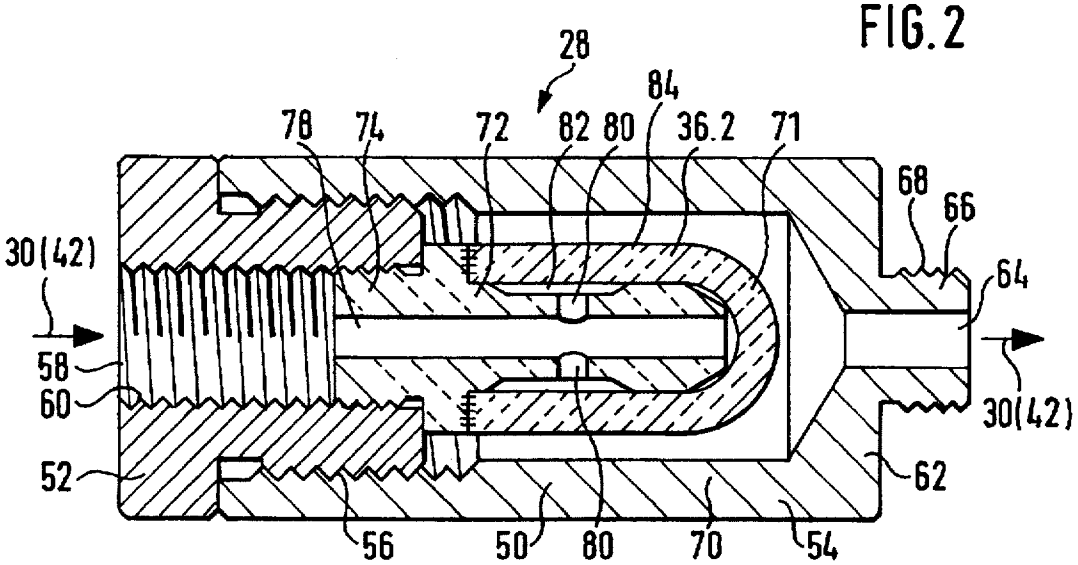
FIG. 2 is an enlarged cross sectional view through a powder barrier according to a preferred embodiment of the invention.

FIG. 2 shown an enlarged cross section of a powder barrier 28 according to a preferred embodiment of the invention. As used herein, the term "powder barrier" is considered equivalent to the term "backflow barrier". The powder barrier 28 has a housing 50 comprised of a tubular first housing part 52 and a tubular second housing part 54. The housing parts 52 and 54 are axially arranged and detachably screwed to one another by means of a threaded joint 56. The first housing part 52 is provided with a first through bore 58 having an internal threading 60. The outer end of the threaded bore 58 is adapted to be secured to a hose or tubular line which receives compressed feed air 30 or auxiliary air 42 from a suitable source (not shown). The second housing part 54 is cup-shaped and has a cylindrical housing shell wall 70. The housing part 54 has a bottom 62 at one end. The housing bottom 62 is provided with an axial, second through bore 64 which extends through an axial port 66 in the housing bottom 62. The port 66 has external threading 68 which serves as a second duct connecting means adapted to connect the powder barrier 28 to feed air and auxiliary air ducts in the injector housing 2 (FIG. 1).

A cup-shaped filter element 36.2 is spaced from the housing bottom 62 and from the cylindrical housing shell wall 70. The filter element 36.2 is of microporous material and is contained in the cup-shaped second housing part 54. The microporous material may be sintered bronze, sintered aluminum or a sintered plastic such as polyethylene, or other material. The pore size may range, for example, between 5 μm and 80 μm. The pores extend through the entire filter element 36.2, making it permeable only to compressed air and not to coating powder. A beam 72 extends axially into the filter element 36.2, from its end away from a filter bottom 71. The beam 72 supports the filter element 36.2 and has a threaded pedestal 74 which is screwed into the downstream end of the internal threading 60 in the bore 58. The beam 72 is provided with an axial through bore 78 and radial bores 80 which branch off the through bore 78. The radial bores 80 empty into a cylindrical, oblong annular space 82 formed between the beam 72 and a cylindrical filter shell wall 84 of the filter element 36.2. This allows the feed air 30 or the auxiliary air 42 to penetrate the filter element 36.2 via a very large inside surface of the cup-shaped filter element 36.2 and to flow through the material of the filter element 36.2 both radially and axially to exit from the entire outside surface of the filter element 36.2 into the interior of the downstream housing part 54. The cup-shaped filter element 36.2 is commercially available as a compressed air muffler, without the beam 72, representing a low-cost mass-produced article.

The powder barrier 28 also may be used in reverse direction, in a fashion such that the inside of the cup-shaped filter element 36.2 bounds the powder space to be shielded (the transition duct 8 with vacuum area or powder duct 4). The feed air 30 or the auxiliary air 42 enters the second housing part 54 from outside through the second through bore 64, exiting from the first housing part 52 through the first through bore 58.

According to a modified embodiment of the injector of FIG. 1, the auxiliary air 42 or additional auxiliary air may be introduced in the suction area formed by the transition duct 8 through a powder barrier 28 and/or a powder barrier filter element 36 or 36.2. It will be appreciated that various other modifications and changes may be made to the above described preferred embodiment of a powder coating system without departing from the scope of the following claims.

I claim:

1. A powder barrier adapted for use in a compressed air path of a powder coating system in which compressed air is passed from a source to a powder feed duct, said powder barrier comprised of a tubular housing of a material impermeable to compressed air consisting of two housing parts which are arranged axially to one another and detachably joined together to form an interior chamber, said housing having an inlet port in one of said housing parts adapted to be connected to receive compressed air from the compressed air source and an outlet port in the other of said housing parts adapted to be connected to deliver a flow of compressed air to said powder feed duct, a beam detachably secured to one of said housing parts to position said filter element in said interior chamber when said housing parts are secured together, and at least one filter element of a microporous material which is permeable to air and not to coating powder secured to said beam between said inlet and outlet ports whereby said ports communicate with one another fluidically only through said filter element, said beam having conduits communicating with said inlet port and which are adapted to deliver compressed air from said inlet port to one side of said filter element, said filter element preventing powder penetration from the powder feed duct to the compressed air source in a direction opposite to the flow direction of compressed air in the compressed air flow path, wherein said inlet port is a threaded opening extending through one of said housing parts, and wherein said beam is threadably secured to said threaded inlet port.

2. A powder barrier for a powder coating system according to claim 1, and wherein said beam has an end projecting into said interior chamber, wherein said conduits extend axially and radially in said projecting beam end, and wherein said filter element is secured over said projecting beam end.

3. A powder barrier for a powder coating system according to claim 2, and wherein said conduits have open ends adjacent to and spaced from an interior surface of said filter element.

* * * * *